(12) United States Patent
Marik et al.

(10) Patent No.: US 10,101,048 B2
(45) Date of Patent: Oct. 16, 2018

(54) SUPERVISORY CONTROLLER FOR HVAC SYSTEMS

(71) Applicant: Honeywell International Inc., Morristown, NJ (US)

(72) Inventors: Karel Marik, Revnice (CZ); Karel Macek, Prague (CZ); Martin Strelec, Chodov (CZ)

(73) Assignee: Honeywell International Inc., Morris Plains, NJ (US)

( * ) Notice: Subject to any disclaimer, the term of this patent is extended or adjusted under 35 U.S.C. 154(b) by 359 days.

(21) Appl. No.: 13/860,318

(22) Filed: Apr. 10, 2013

(65) Prior Publication Data

US 2014/0277760 A1 Sep. 18, 2014

Related U.S. Application Data

(60) Provisional application No. 61/794,820, filed on Mar. 15, 2013.

(51) Int. Cl.
*F24F 11/00* (2018.01)
*G05D 23/19* (2006.01)
*F24F 11/54* (2018.01)

(52) U.S. Cl.
CPC .......... *F24F 11/00* (2013.01); *G05D 23/1927* (2013.01); *F24F 11/54* (2018.01)

(58) Field of Classification Search
CPC .............................. F24F 11/00; G05D 23/1927
USPC ....................................................... 700/276
See application file for complete search history.

(56) References Cited

U.S. PATENT DOCUMENTS

| | | | | |
|---|---|---|---|---|
| 4,187,543 A | * | 2/1980 | Healey | F24F 11/06 165/208 |
| 4,530,395 A | * | 7/1985 | Parker et al. | 165/208 |
| 5,829,674 A | * | 11/1998 | Vanostrand et al. | 236/49.3 |
| 6,467,537 B1 | * | 10/2002 | Bujak, Jr. | 165/209 |
| 2005/0230491 A1 | * | 10/2005 | Pouchak | F23N 5/00 237/81 |
| 2009/0306828 A1 | * | 12/2009 | Larsen et al. | 700/276 |
| 2010/0314458 A1 | * | 12/2010 | Votaw et al. | 236/1 B |

(Continued)

FOREIGN PATENT DOCUMENTS

GB 2448896 * 11/2008 ............. G05B 17/02

OTHER PUBLICATIONS

EP Search Report related to EP Application 14159001.8, dated May 19, 2015 (4 pages).

(Continued)

*Primary Examiner* — Thomas C Lee
*Assistant Examiner* — Alan Chu
(74) *Attorney, Agent, or Firm* — Brooks, Cameron & Huebsch, PLLC

(57) ABSTRACT

A supervisory controller for heating, ventilation, and air conditioning (HVAC) systems is described herein. One device includes a data management module configured to receive a zone demand signal from a local controller of a zone of an HVAC system and receive a number of additional signals from a number of sensors, and a parameter identification module configured to determine, based on the zone demand signal, whether the zone is in a comfort state by loading a best model structure from a number of models and identifying parameters of the best model structure based on data received from the data management module.

16 Claims, 3 Drawing Sheets

(56) References Cited

U.S. PATENT DOCUMENTS

| | | | |
|---|---|---|---|
| 2011/0046790 A1* | 2/2011 | Miller et al. ................. | 700/276 |
| 2011/0054701 A1* | 3/2011 | Wang ..................... | G05B 15/02 |
| | | | 700/278 |
| 2011/0106316 A1* | 5/2011 | Drew et al. ................... | 700/278 |
| 2011/0253796 A1* | 10/2011 | Posa et al. ................... | 236/49.3 |
| 2012/0065783 A1* | 3/2012 | Fadell .................... | F24F 11/006 |
| | | | 700/276 |
| 2013/0085614 A1* | 4/2013 | Wenzel et al. ............... | 700/277 |
| 2014/0039844 A1 | 2/2014 | Strelec et al. | |
| 2014/0067088 A1 | 3/2014 | Macek et al. | |

OTHER PUBLICATIONS

J.A. Clarke, et al. "Simulation-assisted control in building energy management systems". Energy and Buildings. Oct. 1, 2002. pp. 933-940. vol. 34, Issue 9. Retrieved from: http://www.sciencedirect.com/science/article/pii/S0378778802000683.

Li-Chen, et al. "Holonic Supervisory Control and Data Acquisition Kernel for 21st Century Intelligent Building System". Proceedings of the 2000 IEEE International Conference on Robotics & Automation San Francisco. Apr. 1, 2000. 6 pages. Retrieved from: http://www.researchgate.net/profile/Li-Chen_Fu/publication/3847603_Holonic_supervisory_control_data_acquisition_kernal_for_21stcentury_intelligent_building_system/links/0c96050519394cb299fc000000.pdf.

Communication pursuant to Article 94(3) EPC from related EP Application No. 14159001.8 dated Mar. 29, 2018 (5 pages).

\* cited by examiner

SUPERVISORY CONTROLLER FOR HVAC SYSTEMS

CROSS-REFERENCE TO RELATED APPLICATIONS

This application is a non-provisional of U.S. Provisional Application Ser. No. 61/794,820, filed Mar. 15, 2013, the entire specification of which is incorporated herein by reference.

TECHNICAL FIELD

The present disclosure relates to a supervisory controller for heating, ventilation, and air conditioning (HVAC) systems.

BACKGROUND

A heating, ventilation, and air conditioning (HVAC) system can be used to control the environment of a building. For example, an HVAC system can be used to control the air temperature of different zones (e.g., rooms, areas, spaces, and/or floors) of a building.

A control system can be used to control an HVAC system of a building (e.g., the components of the HVAC system). For example, the control system may set and/or reset various set points of the HVAC system, such as, for instance, supply water, air temperature, and/or air speed, among others, depending on the conditions of the building, in order to keep the building (e.g., the zones of the building) in a comfort state. Such a control system can include, for example, a local controller for each zone of the building, and a supervisory controller that can control the local controllers.

In some previous approaches, an HVAC control system may determine whether the zones of the building are in a comfort state based on the temperature(s) of the zones. However, because zone temperature may be controlled by the local zone controllers, using zone temperature to determine comfort state can cause conflicts between the supervisory controller and the local zone controllers. Furthermore, for example, zone temperature may be insensitive to (e.g., remain constant over a broad range of), and/or have a nonlinear relationship, with set points of the HVAC system controlled by the supervisory controller. Further, in order to identify the relationship between zone temperature and the set points of the HVAC system controlled by the supervisory controller, an individual (e.g., occupant or operator) may have to enter the zone while the zone is not in a comfort state, which can cause discomfort for the individual.

Further, some currently deployed supervisory controllers may be difficult, costly, and/or time consuming to install and/or maintain, especially in the case of a large, multi-zone building with a complex HVAC system. For example, a qualified person (e.g., an expert) may be needed to install and/or test such previous supervisory controllers. Additionally, such previous supervisory controllers may not work within the existing infrastructure of the HVAC system, and accordingly may require a retrofitting of, and/or installation of additional equipment in, the HVAC system and/or building. Further, such previous supervisory controllers may have to control all of the local zone controllers (e.g., all of the zones of the building), which can increase the dimensionality of the supervisory controller.

DETAILED DESCRIPTION

Figure 1:
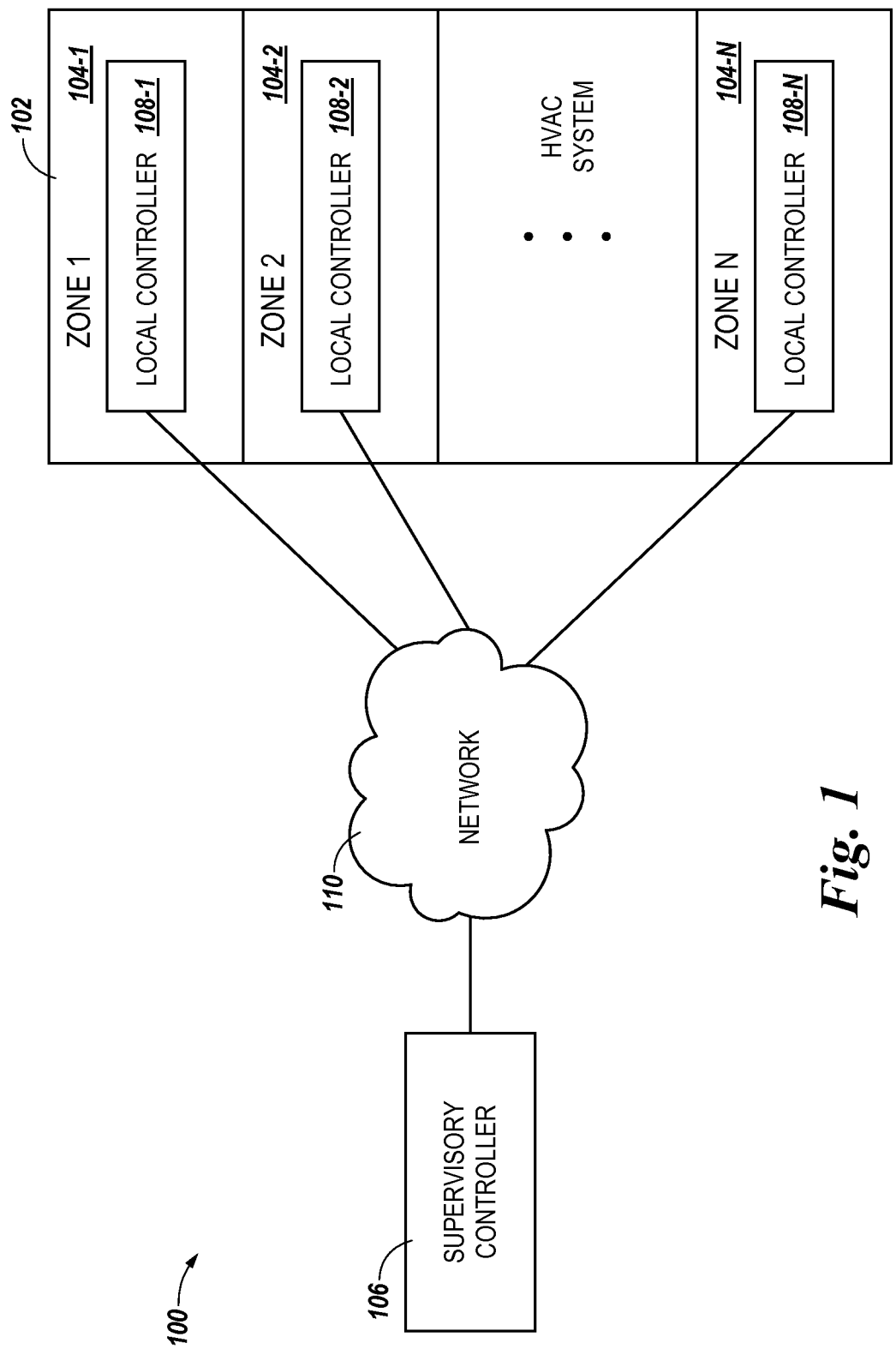
FIG. 1 illustrates a system for controlling an HVAC system in accordance with one or more embodiments of the present disclosure.

A supervisory controller for heating, ventilation, and air conditioning (HVAC) systems is described herein. For example, one or more embodiments include a data management module configured to receive a zone demand signal from a local controller of a zone of an HVAC system and receive a number of additional signals from a number of sensors, and a parameter identification module configured to determine, based on the zone demand signal, whether the zone is in a comfort state by loading a best model structure of a number of models and identifying parameters of the best model structure based on data received from the data management module.

A supervisory controller in accordance with one or more embodiments of the present disclosure can determine whether zones of an HVAC system (e.g., zones of the building controlled by the HVAC system) are in a comfort state based on the zone demand signals from the local controllers of the zones. Accordingly, a supervisory controller in accordance with one or more embodiments of the present disclosure may not conflict (e.g., compete) with the local controllers of the zones. For example, the zone demand signals may not remain constant (e.g., may fluctuate) in the usual operating range (e.g., the comfort range in which zone comfort conditions are satisfied) of the set points of the HVAC system. This principle can apply for both heating and cooling. Further, an individual (e.g., occupant or operator) may not have to enter the zone while the zone is not in a comfort state to identify a comfort-safe region (e.g., subspace) for the set points of the HVAC system, thereby avoiding discomfort for the individual and enabling identification during hours in which the zone is normally occupied.

Further, a supervisory controller in accordance with one or more embodiments of the present disclosure can be used in a large variety of HVAC systems, and may be easier, cheaper, and/or less time consuming to install and/or maintain than previous supervisory controllers, especially in the case of a large, multi-zone building with a complex HVAC system. For example, a supervisory controller in accordance with one or more embodiments of the present disclosure may not need to be installed or tested by a qualified person (e.g., an expert). Additionally, a supervisory controller in accordance with one or more embodiments of the present disclosure may work within (e.g., cooperate with) the existing infrastructure (e.g., previously installed meters and local zone controllers) of the HVAC system, without requiring a retrofitting of, or instillation of additional equipment (e.g., additional sensors or actuators) in, the HVAC system and/or building.

As an additional example, a supervisory controller in accordance with one or more embodiments of the present disclosure may not have to control all of the local zone controllers (e.g., all of the zones of the building), which can reduce the dimensionality of the supervisory controller's optimization task as compared with previous supervisory controllers. For instance, a supervisory controller in accordance with one or more embodiments of the present disclosure can control (e.g., focus on) only the critical zone(s) of the building and/or only the zone(s) of the building with the largest demand (e.g., energy demand).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced by 206 in FIG. 2.

As used herein, "a" or "a number of" something can refer to one or more such things. For example, "a number of local controllers" can refer to one or more local controllers. Additionally, the designator "N" as used herein, particularly with respect to reference numerals in the drawings, indicates that a number of the particular feature so designated can be included with a number of embodiments of the present disclosure.

FIG. 1 illustrates a system 100 for controlling an HVAC system 102 in accordance with one or more embodiments of the present disclosure. HVAC system 102 can be, for example, an HVAC system of a building (e.g., HVAC system 102 can be used to control the environment of the building).

Although not shown in FIG. 1 for clarity and so as not to obscure embodiments of the present disclosure, HVAC system 102 can include a number of components and connections between the components. The components of HVAC system 102 can include, for example, an object(s), control component(s), equipment(s), device(s), network(s), sensor(s), and/or actuator(s) of the HVAC system such as, for instance, a valve(s) such as a heating and/or cooling valve(s), chiller(s) (e.g., chiller plant), boiler(s) (e.g., boiler plant), pump(s) such as hot water and/or chilled water pumps, fan(s), air damper(s) such as a variable air volume (VAV) damper, air handling unit(s) (AHUs) (e.g., AHU plant), coil(s) such as a heating and/or cooling coil, air filter(s), and/or cooling tower(s), among other components. The connections between the components can include, for example, physical connections between the components, such as a chain of equipment (e.g., duct work, pipes, ventilation, and/or electrical and/or gas distribution equipment) that connects the components, among other connections.

As shown in FIG. 1, HVAC system 102 includes (e.g. is divided into) a number (e.g., a plurality) of zones 104-1 (e.g., zone 1), 104-2 (e.g., zone 2), . . . , 104-N (e.g., zone N). The zones of HVAC system 102 can, for example, correspond to zones (e.g. rooms, areas, spaces, and/or floors) of the building.

As shown in FIG. 1, each zone of HVAC system 102 includes a local controller (e.g., zone 104-1 includes local controller 108-1, zone 104-2 includes local controller 108-2, zone 104-N includes local controller 108-N). Each local controller 108-1, 108-2, . . . , 108-N can control a different zone (e.g., the components in and/or associated with that zone) of HVAC system 102. For example, in the embodiment illustrated in FIG. 1, local controller 108-1 controls zone 104-1 (e.g., the components of HVAC system 102 in and/or associated with zone 104-1), local controller 108-2 controls zone 104-2, and local controller 108-N controls zone 104-N.

As shown in FIG. 1, system 100 includes a supervisory controller 106 that can control (e.g., reset) HVAC (e.g., energy) distribution controllers of HVAC system 102 such as, for instance, boiler controllers, chiller controllers, and/or AHU controllers, among others (not shown in FIG. 1). For example, supervisory controller 106 can be a model predictive controller that can control (e.g., supervise the control of) HVAC system 102 (e.g., the components of HVAC system 102). For instance, supervisory controller 106 can set the temperature of zones 104-1, 104-2, . . . 104-N such that the energy (e.g., gas and/or electricity) consumption and/or operational costs of HVAC system 102 are reduced (e.g., minimized) while still meeting the comfort needs of the building. Supervisory controller 106 will be further described herein (e.g., in connection with FIG. 2).

In some embodiments, supervisory controller 106 can be installed in system 100 after HVAC system 102 is installed and after local controllers 108-1, 108-2, . . . , 108-N are installed in HVAC system 102. For example, supervisory controller 106 can be installed plug and play, without a retrofitting of HVAC system 102.

Supervisory controller 106 and local controllers 108-1, 108-2, . . . , 108-N can be coupled (e.g., communicate) via a network 110, as illustrated in FIG. 1. For example, supervisory controller 106 can control local controllers 108-1, 108-2, . . . , 108-N (e.g., HVAC system 102) via network 110.

Network 110 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 110) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 110 can tie a number of computing devices together to form a distributed control network (e.g., permit a mobile device to connect to a server that connects with a building management system).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

For example, supervisory controller 106 can receive (e.g., via network 110) a zone demand signal from one or more of local controllers 108-1, 108-2, . . . , 108-N. The zone demand signal received from a local controller can correspond to (e.g., represent) the output of that local controller, which can correspond to the energy demand of the zone controlled by the local controller. As an example, the zone demand signal received from a local controller can correspond to an amount by which a heating valve controlled by the local controller is open. Such an example will be further described herein (e.g. in connection with FIG. 3).

Supervisory controller 106 can then determine, based on the received zone demand signals, whether the zones controlled by the one or more local controllers (e.g. the zones from which the zone demand signals were received) are in a comfort state (e.g., whether the comfort conditions of the zones, such as temperature, humidity, and or carbon dioxide level, are at pre-defined comfort levels such that the zones are comfortable for their occupants). For example, a zone may be in the comfort state if the zone demand signal received from the local controller of that zone is below a pre-defined level (e.g., 95% or 100%). That is, the zone may not be in the comfort state if the zone demand signal received from the local controller of that zone is not below (e.g., at or above) the pre-defined level. For instance, the zone may not be in the comfort state if the zone demand signal is 100% (e.g., at its maximum level).

In some embodiments, supervisory controller 106 can receive a zone demand signal from a single (e.g., only) one of local controllers 108-1, 108-2, . . . , 108-N, and determine whether the zone controlled by that local controller is in a comfort zone based on the received zone demand signal. That is, in such embodiments, supervisory controller 106 may not receive any zone demand signals from any of the other local controllers, or determine whether any of the other zones are in a comfort state. For instance, in such embodiments, supervisory controller 106 may receive a zone demand signal from local controller 108-1 and determine whether zone 104-1 is in a comfort zone based on the received zone demand signal, but supervisory controller 106 may not receive zone demand signals from local controllers 108-2, . . . , 108-N or determine whether zones 104-2, . . . , 104-N are in a comfort state.

The local controller from which supervisory controller 106 receives the zone demand signal can be, for example, the local controller that controls the critical zone of HVAC system 102. That is, supervisory controller 106 can determine whether only the critical zone of HVAC system 102 is in a comfort state. The critical zone can be, for example, the zone that is most important to the operation of HVAC system 102. For instance, the critical zone can be the zone of HVAC system 102 that has the largest demand (e.g., largest energy demand).

As an additional example, in some embodiments, supervisory controller 106 can receive a zone demand signal from more than one, but less than all, of local controllers 108-1, 108-2, . . . , 108-N, and determine whether the zones controlled by those controllers are in a comfort state based on the received zone demand signals. That is, in such embodiments, supervisory controller 106 may not receive any zone demand signals from any of the other local controllers, or determine whether any of the other zones are in a comfort state. For instance, in such embodiments, supervisory controller 106 may receive a zone demand signal from local controller 108-1, determine whether zone 104-1 is in a comfort state based on the zone demand signal received from local controller 108-1, receive a zone demand signal from local controller 108-2, and determine whether zone 104-2 is in a comfort signal based on the zone demand signal from local controller 108-2. However, supervisory controller 106 may not receive any zone demand signals from any of the other local controllers, or determine whether any of the other zones are in a comfort state.

The local controllers from which supervisory controller 106 receives the zone demand signals can be, for example, the local controllers that control the zones of HVAC system 102 having the largest demands (e.g., the largest energy demands). That is, supervisory controller 106 can determine whether only the zones of HVAC system 102 having the largest demands are in a comfort state. For instance, supervisory controller 106 may not receive zone demand signals from zones of HVAC system 102 having the smallest demands, the zones of HVAC system 102 where the threat of discomfort is not present, or the zones of HVAC system 102 that constantly have extreme and/or outlier demands, or determine whether any of these zones are in a comfort state.

As an additional example, in some embodiments, supervisory controller 106 can receive a zone demand signal from each (e.g., all) local controller 108-1, 108-2, . . . , 108-N, and determine whether each zone of HVAC system 102 is in a comfort zone based on the received zone demand signals. For instance, in such embodiments, supervisory controller 106 may receive a zone demand signal from local controller 108-1, determine whether zone 104-1 is in a comfort zone based on the zone demand signal received from local controller 108-1, receive a zone demand signal from local controller 108-2, determine whether zone 104-2 is in a comfort signal based on the zone demand signal from local controller 108-2, etc.

After determining whether the zones controlled by the one or more local controllers are in a comfort state, supervisory controller 106 can adjust the amount of energy supplied to the zones based on whether the zones are in the comfort state. For example, supervisory controller 106 can maintain (e.g., keep the same) or decrease the amount of energy supplied to the zones determined to be in the comfort state (e.g., the zones whose zone demand signals are below the pre-defined level).

As an additional example, supervisory controller 106 can increase the amount of energy supplied to the zones determined to not be in the comfort state (e.g., the zones whose zone demand signals are not below the pre-defined level). For instance, supervisory controller 106 can increase the amount of energy supplied to the zones determined to not be in the comfort state by the lowest possible amount of energy (e.g., at the lowest possible cost) needed to place (e.g., keep) the zones in the comfort state. Supervisory controller 106 can determine the lowest possible amount of energy needed to place the zones in the comfort state based on, for example, the set points (e.g., actions) of HVAC system 102 (e.g., of the components of HVAC system 102, such as AHU supply and/or extract speed, chilled water pump speed, AHU supply air temperature, and/or hot and/or chilled water flow temperature, among others), the states (e.g., characteristics) of HVAC system 102 (e.g., of the components of HVAC system 102, such as heating and/or cooling demands of the zones, AHU supply and/or return fan speed, hot and/or chilled water pump speed, AHU supply air temperature, hot and/or chilled water temperature, hot and/or chilled water return temperature, and/or AHU air return temperature, among others), the ambient temperature of the zones, the amount and/or cost (e.g., dynamic cost) of energy (e.g., gas, electricity, and/or steam) consumed by the zones, the operating modes of HVAC system 102 (e.g., whether the chiller plant, boiler plant, and/or ventilation of HVAC system 102 are enabled), and/or whether the zones are occupied.

In some embodiments, supervisory controller 106 can periodically receive the zone demand signals from the one or more local controllers, determine whether the zones controlled by the one or more local controllers are in a comfort state, and adjust the amount of energy supplied to the zones controlled by the one or more local controllers. For example, supervisory controller 106 can receive the zone demand signals from the one or more local controllers, determine whether the zones controlled by the one or more local controllers are in a comfort state, and adjust the amount of energy supplied to the zones controlled by the one or more local controllers with selected frequency (e.g., once every 15 minutes). However, embodiments of the present disclosure are not limited to a particular frequency for receiving the zone demand signals from the one or more local controllers, determining whether the zones controlled by the one or more local controllers are in a comfort state, or adjusting the amount of energy supplied to the zones controlled by the one or more local controllers.

After increasing the amount of energy supplied to the zones determined to not be in the comfort state, supervisory controller 106 can evaluate a model used to determine the amount of energy to be supplied to the zones, and tune the model based on the evaluation. For example, supervisory controller 106 can tune the model based on a change(s) in HVAC system 102 after the amount of energy supplied to the zones is increased. The changes to HVAC system 102 can include, for example, a heating plant of HVAC system 102 becoming disabled and/or or floor of HVAC system 102 becoming unoccupied, among other changes. Further, after increasing the amount of energy supplied to the zones determined to not be in the comfort state, supervisory controller 106 can determine (e.g., calculate) a cost saving associated with the increase of the amount of energy supplied to the zones (e.g., the cost saved by only increasing the amount of energy supplied to the zones by the lowest possible amount of energy needed to place the zones in the comfort state).

Figure 2:
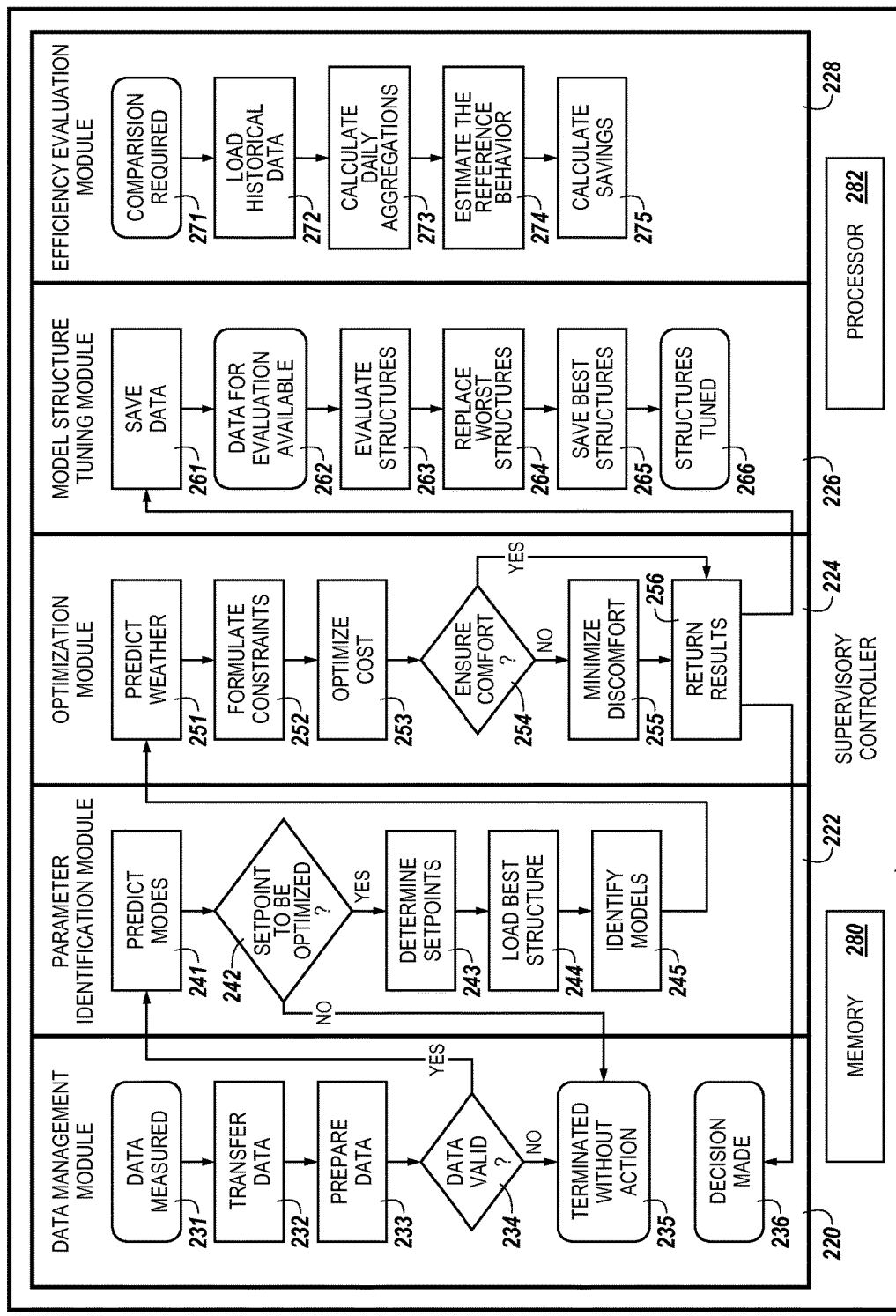
FIG. 2 illustrates a supervisory controller for an HVAC system in accordance with one or more embodiments of the present disclosure.

FIG. 2 illustrates a supervisory controller 206 for an HVAC system in accordance with one or more embodiments of the present disclosure. Supervisory controller 206 and the HVAC system can be, for example, supervisory controller 106 and HVAC system 102, respectively, previously described in connection with FIG. 1.

As shown in FIG. 2, supervisory controller 206 includes a data management module (e.g., layer and/or function block) 220. Data management module 220 can receive a zone demand signal from a local controller of a zone of the HVAC system, and additional signals from other sensors (e.g., outside temperature, gas consumption, and/or electricity consumption sensors, among others). The zone demand signal can be, for example, a zone demand signal from a local controller 108-1, 108-2, . . . , 108-N of a zone 104-1, 104-2, . . . , 104-N, as previously described in connection with FIG. 1. Data management module 220 can receive the zone demand signal from the local controller via a network (e.g., network 110), as previously described in connection with FIG. 1.

Data management module 220 can remotely communicate (e.g., via the network) with the HVAC system (e.g., with a building management system (BMS) of the HVAC system) and store data to a database. For example, as shown in FIG. 2, data management module 220 can receive data via block 231. The measured data can include, for example, data measured by sensors and/or meters of the HVAC system, such as, for instance, ambient temperature and/or energy consumption of the HVAC system.

As shown in FIG. 2, data management module 220 can transfer the data at block 232, prepare the data at block 233, and determine whether the data is valid at block 234. If the data is not valid, data management module 220 terminates the data without action at block 235.

Although not shown in FIG. 2, data management module may archive the data (e.g., in a back-end database), synchronize the data (e.g., missing values of the data), transform the data (e.g., transform cumulative energy consumption measured by meters to an interval energy consumption), calculate aggregated variables (e.g., calculate a median ambient temperature from the temperatures measured by multiple sensors and/or an aggregated energy consumption from the energy consumption measured by multiple meters), and/or download a weather forecast (e.g., from a weather service).

As shown in FIG. 2, supervisory controller 206 includes a parameter identification module 222. Parameter identification module 222 can determine, based on the zone demand signal received by data management module 220, whether the zone is in a comfort state. For example, the zone may be in the comfort state if the received zone demand signal is below a pre-defined level, as previously in connection with FIG. 1.

Parameter identification module 222 can estimate model parameters. That is, parameter identification module 222 can identify a model by identifying a number of model parameters from data. Model parameters can include discrete parameters (e.g., a model structure) and continuous parameters.

A model, as used herein, can include a number of model parameters estimated (e.g., regression coefficients estimated) and associated with a number of input variables. The model can be determined and/or identified by using parameter estimation applied to a model structure and measured data to determine the number of regression coefficients. For instance, a model can result in a prediction of a number variables of a dynamic system (e.g., values of variables with a linear dependency) based on estimated model parameters (e.g., regression coefficients) associated with particular input variables and recently measured data.

Examples of models can include a cost model of running a controlled system (e.g. an HVAC system) and a model of dynamics of the controlled system, for instance. For example, a dynamic system model can describe an evolution of the dynamic system, such as the state of an HVAC system (e.g., HVAC system 102) and the building controlled by the HVAC system, over time. A cost model can calculate costs related to a particular state and/or operation of the dynamic system, such as the energy consumption of the HVAC system. The dynamic system model and the cost model can be interconnected in that the evolution of the dynamic system can have related costs.

As used herein, a model structure can include a relationship between a number of variables in a dynamic system. For example, a model structure can be used to determine which model parameters are to be estimated using measured data. A model structure can include the used variables, the order of the used variables, and local bandwidths (e.g., model structure parameters).

For instance, used variables in an HVAC system can include set points (e.g., actions) of the HVAC system (e.g., of the components of the HVAC system, such as AHU supply and/or extract speed set point, chilled water pump speed set point, AHU supply air temperature set point, and/or hot and/or chilled water flow temperature set point, among others), states (e.g., characteristics) of the HVAC system (e.g., of the components of the HVAC system, such as heating and/or cooling demands of the HVAC system, among others), disturbances affecting the HVAC system (e.g., weather variables, such as the ambient temperature of the HVAC system), the amount and/or cost of energy (e.g., gas, electricity, and/or steam) consumed by the HVAC system, the operating modes of plants of the HVAC system (e.g., whether the chiller plant, boiler plant, and/or ventilation of the HVAC system are enabled), and/or whether zones of the HVAC system are occupied, among other variables.

As an example, a state model of an HVAC system can be given by:

$$x(t)=Ax(t-i)+Bu(t-i)+Cd(t-i)$$

where x is state vector (e.g., past and/or predicted state), u is set point vector (e.g., past and/or optimized set point), d is ambient temperature vector (e.g., past and/or forecast ambient temperature), A, B, and C are parameter matrices (e.g., three-dimensional matrices: state×variable×lag i), and t is time of day. The parameters of the state model can be estimated on the fly prior to each optimization step, using local regression (e.g., using similar situations in the process history), and/or using robust estimation (e.g., iteratively removing outliers).

As an additional example, an energy consumption model of an HVAC system can be given by:

$$y=x^T Q_x x + u^T Q_u u + d^T Q_d d + x_T Q_{xu} u + x^T Q_{ud} d + u^T Q_{ud} d + L_x x + L_u u + L_d d + c$$

where y can be electricity and gas (or other purchased utility) consumption vector (e.g., past and forecast consumption), x are state vectors (e.g., past and/or predicted states), u are set point vectors (e.g., past and/or optimized set points), d are disturbance vectors (e.g., past and/or forecast ambient temperatures), Q are quadratic parameter matrices (e.g., four-dimensional matrices: energy×variable×variable×lag i), L are linear parameter matrices (e.g., three-dimensional matrices energy×variable×lag), and c is a constant term. That is, the energy consumption model can be a linear-quadratic model for both gas and electricity consumption. The parameters of the energy consumption model can be estimated on the fly, using local regression, and/or using robust estimation in a manner analogous to the state model.

As shown in FIG. 2, if the data is determined to be valid at block 234, parameter identification module 222 can predict modes from the data at block 241. Modes can include a variable that indicates an operational status of a device and/or equipment. For example, a mode can include enable and/or disabled. A disabled mode can include an indication a device and/or equipment is not activated, functional, and/or not in the dynamic system. An enabled mode can include an indication that a device and/or equipment is operational, activated, and/or in the dynamic system. The modes can represent important information that assists to determine a set point. For instance, if a zone is unoccupied, the internal temperature of the zone can be omitted.

As shown in FIG. 2, parameter identification module 222 can determine if any set points are to be optimized at block 242. A set point can include a controlled variable and/or desired outcome that can be set up by supervisory controller 206. For instance, a set point can include supply air temperature of an air handler, and to reach the set point a level of heating and/or cooling may need to be changed. A local controller (e.g., a thermostat) can ensure a set point will be achieved.

If no set points are to be optimized (e.g., all plants are disabled and/or all mode signals are zero), data management module 220 terminates the data without action at block 235. If set points are to be optimized, parameter identification module 222 can determine the enabled set points at block 243, load the best model structure at block 244, and identify a model at block 245. The model identified can include a model with estimated model parameters (e.g., regression coefficients) determined using the best model structure loaded and recently measured data (e.g., parameter estimation performed using the best model structure and recently measured data).

As shown in FIG. 2, supervisory controller 206 includes an optimization module 224. Optimization module 224 can adjust the amount of energy supplied to a zone of the HVAC system based on whether the zone is in a comfort state. For example, optimization module 224 can maintain or decrease the amount of energy supplied to the zone if the zone is in the comfort state, and optimization module 224 can increase the amount of energy supplied to the zone if the zone is not in the comfort state, as previously described in connection with FIG. 1. Further, optimization module 224 can use the models identified by parameter identification module 222 to reduce (e.g., minimize) purchased energy while keeping the comfort of the zone at a defined level.

For example, as shown in FIG. 2, after enabled set points are determined at block 243, optimization module 224 can predict a weather forecast affecting the HVAC system at block 251, formulate constraints at block 252, and optimize cost at block 253. The constraints can include, for example, box constraints for the set points (e.g., actions) of the HVAC system, movement (e.g., difference) constraints for the set points of the HVAC system, and/or comfort constraints for the zones of the HVAC system (e.g., the worst zone demand, which can be defined prior to model parameter identification). The cost can be optimized using, for example, variable energy prices that vary according to tariff information (e.g., time of day).

As shown in FIG. 2, optimization module 224 can determine whether comfort can be ensured at block 254. If comfort can be ensured, the results can be returned at block 256. If comfort can not be ensured, the discomfort can be minimized at block 255 and then the results can be returned at block 256. Returning the results at block 256 can include solving the optimization and sending control signals back to data management module 220 at block 236.

Determining whether comfort can be ensured and minimizing the discomfort can include, for example, determining whether the comfort (e.g., zone demand) exceeds a hard comfort limit. The hard comfort limit can be a trigger to run a rule-based discomfort minimization. For example, if the comfort does not exceed the hard comfort limit, the set points of the HVAC system can be optimized. If the comfort exceeds the hard comfort limit, a rule-based maximum cooling and/or heating operation can be run, and if no set points are left to be optimized after running the cooling and/or heating operation(s), the set points can be reset. If there are any set points left to be optimized after running the cooling and/or heating operation(s), they can be optimized.

After optimizing the set points, it can be determined whether a feasible soft comfort limit solution can be found. The soft comfort limit can act as an upper demand constraint for the optimizer. For example, if a feasible soft comfort solution can be found, the set points of the HVAC system can be reset accordingly. If a feasible soft comfort solution can not be found, a model based discomfort minimization and free set point optimization can be performed, and the set points can then be reset.

As shown in FIG. 2, supervisory controller 206 includes a model structure tuning module 226. Model structure tuning module 226 can evaluate the model used to determine the amount of energy supplied to the HVAC system (e.g., the zones of the HVAC system), and tune the model based on the evaluation. For example, model structure tuning model 226 can tune the model based on a change(s) in the HVAC system after the amount of energy supplied to the zones of the HVAC system is increased, as previously described in connection with FIG. 1. Further, model structure tuning module 226 can optimize the model structure for the optimized system.

For example, as shown in FIG. 2, after the results are returned at block 256, model structure tuning module 226 can save data for a number of model structures for an evaluation period at block 261. For instance, a best model structure can be used in a first optimization process.

Data to identify the best model structure and the number of model structures can be saved for a future evaluation of the number of model structures. The data can, for instance, include a number of model structure parameters for the model. A best model structure for a second optimization process may be different then the best model structure for the first optimization process, for example.

The model structure parameters can include, for example, state model structures, cost model structures, locality (e.g., bandwidth) parameters, and/or outlier removal parameters. State model structures can include input-output variable assignments, such as, for instance, A-B-C state-action-disturbance assignment matrices. Cost model structures can include input-output variable assignments for linear and quadratic dependences, such as, for instance, cost versus state-action-disturbances relation matrices. Locality parameters can include forgetting factors (e.g., days), time of day localities, state locality vectors (e.g., five degrees for a zone's average temperature), and/or disturbance locality vectors (e.g., 10 degrees for ambient temperature). Outlier removal parameters can include cut ratios (e.g., number of error standard deviations) and/or number of iterations.

An initial model structure can be generated using prior information (e.g., if prior information is available) or without using prior information (e.g., if prior information is not available). An initial model structure generated without using prior information can be a maximum model structure. An initial model structure generated using prior information can forbid non-existing input-output relations, such as, for instance, an AHU not having a cooling coil, an AHU influencing zones of only one floor, hot water temperature not affecting zone air quality, and/or zone air quality being adjusting by adjusting only supply and return fan speed. The prior information can be inserted into the model structure manually (e.g., by an expert) or automatically (e.g., using a building information model).

As shown in FIG. 2, model structure tuning module 226 can determine if data for evaluation is available at block 262. For example, data for evaluation can include a number of observed variables (e.g., parameters) of the HVAC system for a period of time.

An observed variable can include observed values for a number of variables over a period of time. For example, an observed variable can include an observed independent variable and an observed dependent variable over a time period of one hour. A variable can be observed using a sensor associated with the variable to take a time-series of values and/or obtained by an action of an operator (e.g., resetting by an operator).

The data available for evaluation can include a result of performance of the number of model structures saved for an evaluation period at block 261. For instance, data for a number of model structures for an evaluation period to be saved at block 261, and data available to evaluate the number of model structures at block 262, can occur simultaneous at each time period.

As shown in FIG. 2, model structure tuning module 226 can evaluate the number of model structures at block 263. The number of model structures can include a population of a number of candidate model structures. A candidate model structure and/or a model structure in the population of model structures can include a model structure that is a candidate for being a best model structure.

In some embodiments, evaluating the number of candidate model structures can include predicting a variable for each of a number of models associated with a candidate model structure and calculating a rate of error of the predicted variable for each of the number of candidate model structures compared to an observed variable. In some embodiments, evaluating a model structure can include calculating a predicted value for a number of variables in a model associated with the model structure over a period of time. The predicted value for each of the number of variables can be compared to an observed value for each of the number of variables over the period of time.

A rate of error for the model structure can be calculated by comparing the predicted values and the observed values. A predicted value for a number of variables can include a prediction of a value for an independent variable and/or dependent variable based upon a number of known variables. The predicted values can be predicted for a period of time (e.g., one hour).

For the predictions, model parameters may need to be estimated for each model structure of the number of model structures at block 263 with respect to the data saved at block 261 considered for a prediction situation in the past. For the estimations, all model structures in the population of model structures (e.g., not just the best model structure) are considered.

The evaluation is possible with this delay because after the delay, real data can be measured. Thereby, the error can be calculated using the real data.

As shown in FIG. 2, model structure tuning module 226 can replace a number of worst model structures among the number of model structures at block 264. A worst model structure can include a model structure with a higher calculated rate of error than the remaining number of model structures (e.g., the population of candidate model structures). In some embodiments, a worst model structure can include a model structure with less then a threshold number of observed values, for example. A threshold number of observed values can, for instance, include a threshold number of evaluations of the model structure. A model structure with fewer evaluations than the threshold number of evaluations can also include an immature model structure, for example.

A worst model structure can, for instance, be replaced with a revised model structure. The revised model structure can be generated using, for example, stochastic optimization (e.g., combination of successful models) and/or parameter sensitivity analysis (e.g. for input-output variable assignments), among other methods.

As shown in FIG. 2, model structure tuning module 226 can save the best model structure at block 265. Model structure tuning module 226 can determine and/or identify the best model structure among the number of model structures based on the calculated rate of error. A best model structure can include a model structure with a lowest calculated rate of error among the number of model structures. The saved best model structure, for example, can be used with recently measured data to produce a model with estimated model parameters (e.g., regression parameters). For instance, the saved best model structure can be used for optimization.

As shown in FIG. 2, the blocks performed by model structure tuning module 226 can result in the number of model structures of HVAC system being tuned at block 266. For example, tuning the model structures can include evaluating the number of model structures at block 263, replacing the worst model structures among the number of model structures at block 264, and saving the best model structure at block 265. This can, for example, result in a collection of iteratively tuned model structures (e.g., a population of candidate model structures).

As shown in FIG. 2, supervisory controller 206 includes efficiency evaluation model 228. Efficiency evaluation model 228 can determine a cost savings associated with adjusting the amount of energy supplied to the zone(s) of the HVAC system. For example, efficiency evaluation model 228 can determine the cost savings associated with the increase of the amount of energy supplied to the zone(s) (e.g., the cost saved by only increasing the amount of energy supplied to the zone(s) by the lowest possible amount needed to place the zone(s) in the comfort state). Further, efficiency evaluation model 228 can evaluate and report the cost savings.

For example, as shown in FIG. 2, efficiency evaluation model 228 can determine that an energy consumption comparison is required at block 271, and load historical energy consumption data of the HVAC system at block 272. Efficiency evaluation model 228 can then calculate the daily energy consumption aggregations (e.g., compare daily energy consumptions) of the HVAC system at block 273. In some embodiments, the energy consumption aggregations can be calculated for only working days (e.g., the energy consumption of the HVAC system on non-working days may not be considered).

As shown in FIG. 2, efficiency evaluation model 228 can estimate the reference behavior (e.g., baseline) of the HVAC system at block 274, and the daily energy consumptions can be compared against the estimated reference behavior. Efficiency evaluation model can then calculate the cost savings at block 275.

As shown in FIG. 2, supervisory controller 206 includes a memory 280 and a processor 282. Memory 280 can be any type of storage medium that can be accessed by processor 282 to perform various examples of the present disclosure. For example, memory 280 can be a non-transitory computer readable medium having computer readable instructions (e.g., computer program instructions) stored thereon that are executable by processor 282 to perform the functions of data management module 220, parameter identification module 222, optimization module 224, model structure tuning module 226, and efficiency evaluation model 228 in accordance with one or more embodiments of the present disclosure.

Memory 280 can be volatile or nonvolatile memory. Memory 280 can also be removable (e.g., portable) memory, or non-removable (e.g., internal) memory. For example, memory 280 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 280 is illustrated as being located in supervisory controller 206, embodiments of the present disclosure are not so limited. For example, memory 280 can also be located internal to another computing resource (e.g., enabling computer readable instructions to be downloaded over the Internet or another wired or wireless connection).

Figure 3:
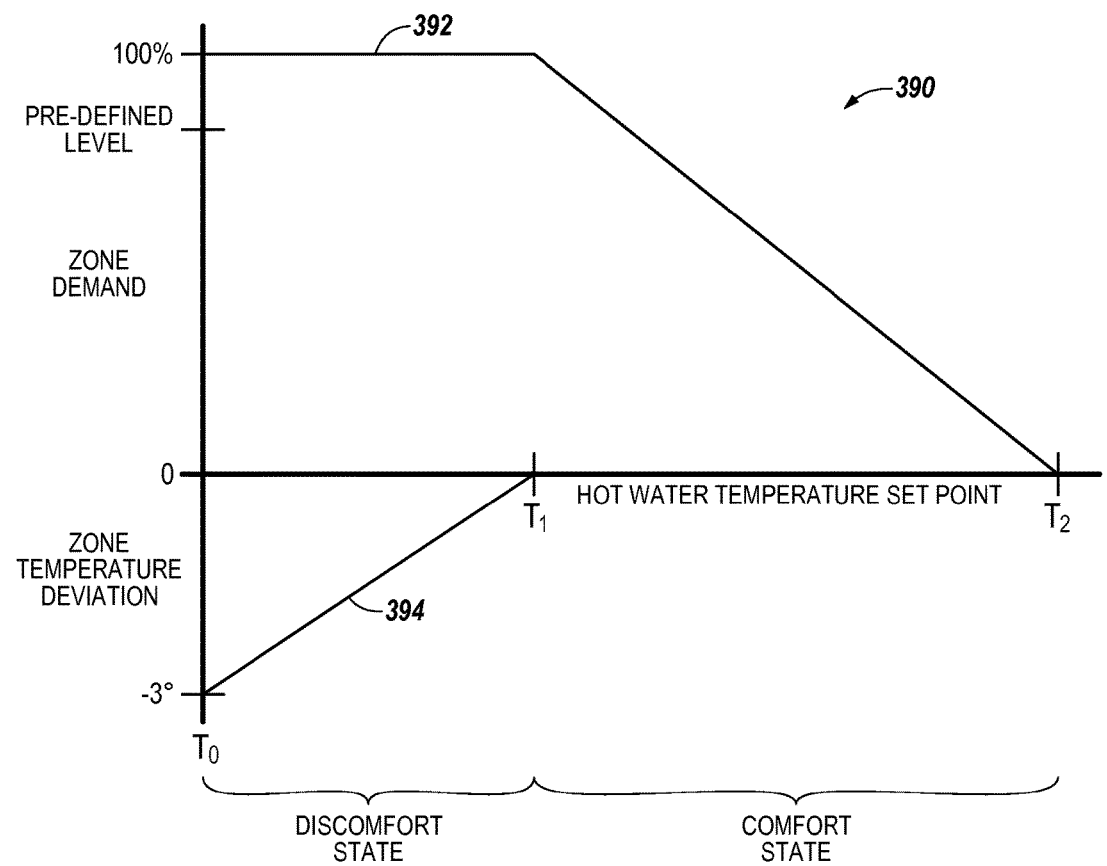
FIG. 3 illustrates an example of a graph of a demand and temperature deviation of a zone of an HVAC system in accordance with one or more embodiments of the present disclosure.

FIG. 3 illustrates an example of a graph 390 of a demand and temperature deviation of a zone of an HVAC system in accordance with one or more embodiments of the present disclosure. In the example illustrated in FIG. 3, the demand of the zone is represented by signal 392, the temperature deviation of the zone is represented by signal 394, and the x-axis of graph 390 is an optimized set point of the HVAC system (e.g., a hot water temperature set point). As shown in FIG. 3, the demand and temperature deviation of the zone change as the optimized set point changes. The zone can be, for example, one or more of zones 104-1, 104-2, . . . , 104-N of HVAC system 102 previously described in connection with FIG. 1.

Zone demand signal 392 can correspond to (e.g., represent) the output of a local controller (e.g., local controller 108-1, 108-2, . . . , 108-N previously described in connection with FIG. 1) of the zone, which can correspond to the energy demand of the zone. As an example, zone demand signal 392 can correspond to an amount (e.g., percentage) by which a heating valve controlled by the local controller is open. The heating valve can, for example, control the supply of hot water provided to the zone. Zone temperature deviation signal 394 can correspond to (e.g., represent) the difference between the actual temperature of the zone and the set point (e.g., pre-defined comfort level) temperature for the zone.

FIG. 3 illustrates the dependence between the optimized set point of the HVAC system (e.g., the optimized hot water temperature set point) and the zone temperature deviation. For example, if the hot water temperature is low, then the energy supply is low and the controller energy demand is 100% as the zone temperature is below the set point temperature for the zone. Conversely, if the hot water temperature is sufficiently high, then the controller demand (e.g., valve opening) is modulated by the local controller in order to keep the required level of energy inside the zone.

For example, as shown in FIG. 3, if the hot water temperature set point is T0, zone demand signal 392 is greater than a pre-defined level (e.g., 95%). For instance, at if the hot water temperature set point is T0, zone demand signal 392 is at 100% (e.g., the heating valve controlled by the local controller of the zone is fully open), as illustrated in FIG. 3. This may be an indication that the zone is not in a comfort state (e.g., that the zone is in a discomfort state), as previously described herein (e.g., in connection with FIG. 1). For example, the temperature deviation of the zone is −3 degrees (e.g., the temperature of the zone is three degrees below the set point temperature for the zone) if the hot water temperature set point is T0. This may be due to for example, an insufficient supply of hot water to the zone.

Because the zone may not be in a comfort state if the hot water temperature set point is T0, the amount of energy supplied to the zone may be increased, as previously described herein (e.g., in connection with FIG. 1). Increasing the amount of energy supplied to the zone may decrease the temperature deviation of the zone, as illustrated in FIG. 3. For example, if the hot water temperature set point is T1, the temperature deviation of the zone may be zero (e.g. the temperature of the zone may be the set point temperature for the zone), as illustrated in FIG. 3. Further, if the hot water temperature set point is at T1 (e.g., if the temperature deviation of the zone is zero), zone demand signal 392 may decrease (e.g., the local controller of the zone may close the heating valve) and fall below the pre-defined level, approaching zero if the hot water temperature set point is T2, as illustrated in FIG. 3. That is, the zone may enter the comfort state, and the energy demand of the zone may decrease, if the hot water temperature set point is T1 or T2.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A supervisory controller for a heating, ventilation, and air conditioning (HVAC) system, comprising:
    a data management module configured to receive a zone demand signal from a local controller of a zone of the HVAC system and receive a number of additional signals from a number of sensors, wherein the zone demand signal corresponds to an energy demand amount of the zone and the number of sensors include a gas consumption sensor configured to sense an amount of energy consumed by the HVAC system;
    a parameter identification module configured to determine, based on the zone demand signal, whether the zone is in a comfort state;
    an optimization module configured to:
        adjust an amount of energy supplied to the zone based on the amount of energy consumed by the HVAC system sensed by the gas consumption sensor;
        increase the amount of energy supplied to the zone if the zone demand signal is 100% by increasing a hot water temperature set point for water provided to the zone; and
        decrease the amount of energy supplied to the zone if the zone demand signal is less than 100% by decreasing the hot water temperature set point for water provided to the zone; and
    a model structure tuning module configured to, after the amount of energy supplied to the zone is increased or decreased by the optimization module:
        evaluate a model used to determine the amount of energy supplied to the zone; and;
        tune the model based on a heating plant of the HVAC system becoming disabled as a result of the heating plant not being functional.

2. The supervisory controller of claim 1, wherein the zone is in the comfort state if the zone demand signal is below a pre-defined level.

3. The supervisory controller of claim 1, wherein the optimization module is configured to increase the amount of energy supplied to the zone if the zone is not in the comfort state.

4. The supervisory controller of claim 3, wherein the optimization module is configured to increase the amount of energy supplied to the zone to an amount of energy needed to place the zone in the comfort state.

5. The supervisory controller of claim 3, wherein the supervisory controller includes an efficiency evaluation module configured to, after the amount of energy supplied to the zone is increased, determine a cost savings associated with the increase of the amount of energy supplied to the zone.

6. The supervisory controller of claim 1, wherein the zone demand signal corresponds to an output of the local controller of the zone.

7. A non-transitory computer readable medium having computer readable instructions stored thereon that are executable by a processor to:
    receive a zone demand signal from a local controller of a zone of a heating, ventilation, and air conditioning (HVAC) system and receive a number of additional signals from a number of sensors, wherein the zone demand signal corresponds to an energy demand amount of the zone and the number of sensors include an electricity consumption sensor configured to sense an amount of energy consumed by the HVAC system;
    determine, based on the zone demand signal, whether the zone is in a comfort state;
    adjust, based on whether the zone is in the comfort state and on the amount of energy consumed by the HVAC system sensed by the electricity consumption sensor, an amount of energy supplied to the zone;
    increase the amount of energy supplied to the zone if the zone demand signal is 100% by increasing a hot water temperature set point for water provided to the zone;
    decrease the amount of energy supplied to the zone if the zone demand signal is less than 100% by decreasing the hot water temperature set point for water provided to the zone; and
    after the amount of energy supplied to the zone is increased or decreased:
        evaluate a model used to determine the amount of energy supplied to the zone; and
        tune the model based on a heating plant of the HVAC system becoming disabled as a result of the heating plant not being functional.

8. The computer readable medium of claim 7, wherein the instructions are executable to adjust the amount of energy supplied to the zone based on at least one of:
    set points of the HVAC system;
    states of the HVAC system;
    an ambient temperature of the zone;
    a cost of energy consumed by the zone;
    operating modes of the HVAC system; and
    whether the zone is occupied.

9. The computer readable medium of claim 7, wherein the instructions are executable to:
periodically receive the zone demand signal from the local controller;
periodically determine, based on the zone demand signal, whether the zone is in the comfort state; and
periodically adjust, based on whether the zone is in the comfort state, the amount of energy supplied to the zone.

10. A system for controlling a heating, ventilation, and air conditioning (HVAC) system, comprising:
a plurality of local controllers, wherein each of the plurality of local controllers is configured to control a different zone of the HVAC system; and
a supervisory controller for the HVAC system, wherein the supervisory controller is configured to:
receive a zone demand signal from one or more of the plurality of local controllers, wherein the zone demand signal received from each respective local controller corresponds to an energy demand amount of the zone controlled by that local controller;
receive a number of additional signals from a number of sensors, wherein the number of sensors include a gas consumption sensor and an electricity consumption sensor configured to sense an amount of energy consumed by the HVAC system;
determine, based on the received zone demand signals, whether the zones controlled by the one or more local controllers are in a comfort state;
adjust an amount of energy supplied to the zones based on the amount of energy consumed by the HVAC system sensed by the gas consumption sensor and the electricity consumption sensor;
increase an amount of energy supplied to the zones whose zone demand signals are 100% by increasing a hot water temperature set point for water provided to those zones;
decrease the amount of energy supplied to the zones whose zone demand signals are less than 100% by decreasing the hot water temperature set point for water provided to those zones; and
after the amount of energy supplied to the zones is increased or decreased:
evaluate a model used to determine the amount of energy supplied to the zones; and
tune the model based on:
a heating plant of the HVAC system becoming disabled as a result of the heating plant not being functional; and
a floor of the HVAC system becoming unoccupied.

11. The system of claim 10, wherein a zone is not in the comfort state if the zone demand signal received from the local controller configured to control that zone is not below a pre-defined level.

12. The system of claim 10, wherein the supervisory controller is configured to increase an amount of energy supplied to the zones determined to not be in the comfort state.

13. The system of claim 10, wherein the supervisory controller is configured to:
receive a zone demand signal from a single one of the plurality of local controllers; and
determine, based on the received zone demand signal, whether the zone controlled by the single local controller is in a comfort state.

14. The system of claim 10, wherein the supervisory controller is configured to:
receive a zone demand signal from less than all of the plurality of local controllers; and
determine, based on the received zone demand signals, whether the zones controlled by the less than all of the local controllers is in a comfort state.

15. The system of claim 10, wherein the supervisory controller is configured to:
receive a zone demand signal from each of the plurality of local controllers; and
determine, based on the received zone demand signals, whether each zone of the HVAC system is in a comfort state.

16. The system of claim 10, wherein the supervisory controller is installed after the HVAC system is installed and after the plurality of local controllers are installed in the HVAC system.

* * * * *